3,544,339
METHOD OF RETAINING INTEGRITY OF THE OPEN END OF SHIRRED FOOD CASINGS
Henry Majewski, Le Mont, and John K. Hutson, Country Club Hills, Ill., assignors to Union Carbide Corporation, a corporation of New Jersey
No Drawing. Filed Dec. 6, 1966, Ser. No. 599,365
Int. Cl. A22c 13/00
U.S. Cl. 99—176                                  9 Claims

ABSTRACT OF THE DISCLOSURE

A method is provided for treating the open end of a shirred casing stick so that the pleats formed therein are locked in place to retain their integrity and will not become dissociated or decompacted during humidificaton and prior to use of the casing stick.

---

This invention relates to a method of retaining the integrity of the open end of shirred food casings. More particularly, this invention relates to a method for preventing the open end of shirred food casings from becoming closed or from having obstructions formed in the bores thereof.

As used thoroughout this application and in the appended claims, it should be understood that the term "food casing" refers to and is intended to include those materials approved for use with food items. Exemplary of such food casings are those obtained from materials such as cellulose, regenerated cellulose, cellulose having fibers embedded therein, collagen, natural or synthetic starches and proteins, and the like, which are employed as containers or molds for food emulsions. These food casings, upon being stuffed with a food emulsion, are then subjected to curing, cooking and other processing methods well known to those skilled in the art in order to cook and cure the food emulsion stuffed therein.

In like manner, the term "food emulsion" as used throughout this application and in the appended claims, should also be understood as referring to and is intended to include such food compositions as discrete meat particles, meat emulsions containing meat particles or chunks of meat therein, and the like, and from which food items such as frankfurters, sausages and the like are obtained.

Food casings are generally prepared for stuffing with a food emulsion by forming pleats in and then compacting a length of food casing into short lengths, commonly referred to in the art as shirred casing sticks. Hence, food casings of a length of between about 40 to 80 feet and longer are pleated and compacted into shirred casing sticks of a length of between about 10 to 22 inches, depending, at least in part, upon the length of the food casing prior to being compacted. These shirred casing sticks are then usually packed in containers called caddies for shipment to a food packer and processor who then stuffs the food casing with a food emulsion, cooks and cures the encased food emulsion and subsequently packages and delivers the food item for distribution and/or sale to the consumer. A typical method of pleating and compacting lengths of food casing into shirred casing sticks is disclosed in U.S. Pat. 2,984,574 to Matecki.

In order to facilitate the food packers' stuffing operation, one end of these shirred casing sticks is usually closed and the other end is left open so that this open end can be placed over a stuffing tube through which a food emulsion is metered and fed into the shirred casing stick and stuffed therein.

Prior to being stuffed with a food emulsion, the shirred casing sticks are humidified in order to render them more pliable and workable. Humidification of the shirred casing sticks also minimizes and prevents breakage of the shirred casing sticks when they are handled, thereby reducing waste. The shirred casing sticks can be humidified either prior to or after being packed into a caddy, but, in any event, are humidified prior to use; that is, prior to being placed on a stuffing tube and stuffed with a food emulsion.

According to present conventional methods of packaging shirred food casings, the shirred casing sticks are first humidified and then permitted to equilibrate; that is, the humidified shirred food casings are permitted to reach equal and constant moisture content throughout the shirred sticks. During this equilibration time, it has been found that the last few pleats formed in the open end of the casing stick tend to become deshirred; that is, part of the shirred casing at the open end becomes decompacted and dissociated from the body of the shirred casing stick by either folding into the bore of the shirred stick or shifting from its alignment with the remainder of the shirred stick. This results in and causes obstructions in the bore at the open end of the casing stick. The shirred casing sticks whose open ends are obstructed must either have the obstruction removed and the bore cleared or the casing stick is discarded. In practice, the food packer or processor will return an entire shipment of shirred casing sticks when 2 to 3 or more casing sticks in a caddy have obstructions in their open ends. Since the food packer or processor generally uses automatic stuffing equipment, he cannot tolerate obstructed casing sticks since they will interfere with and upset his production schedules resulting in the loss of valuable time and unnecessary expenditure of labor.

It is the general object of this invention, therefore, to provide a method for treating the open end of a shirred casing stick so that it will retain its integrity and not become dissociated from the body of the casing stick or have obstructions formed in its bore during humidification and prior to use.

This and further objects of the present invention will become apparent from the ensuing discussion.

The objects of the present invention can be generally accomplished by applying a stiffening agent to the open end of a shirred casing stick which stiffening agent will not be disturbed or affected during humidification of the shirred casing stick, thereby retaining the shirred integrity of the open end of the casing stick until it is used.

The stiffening agent can be applied to the open end of the shirred casing stick at any time after the casing has been compacted and shirred but, in any event, should be applied prior to humidification of the shirred casing stick. In a preferred embodiment of the present invention, the stiffening agent is applied immediately after the casing has been shirred and compacted.

The materials which can be employed as the stiffening agent in the present invention are not critical since a great variety of materials have been found to be operable as such. Hence, reference to the term "stiffening agent" as used throughout this application and in the appended claims should be understood as referring to and including but not limited by such exemplary materials as synthetic and natural glues, polymeric resins, thermosetting polymeric resins, thermoplastic polymeric resins, microcrystalline waxes, and the like.

When synthetic or natural glues are employed as the stiffening agent, they can be applied to the shirred food casings in the form of an aqueous emulsion or suspension. Similarly, polymeric resins, such as polyvinyl acetate, and thermosetting polymeric resins, such as polyamide epichlorohydrin, polyacrylamide, polyurethanes, and the like, can be applied in the form of an aqueous solution or dispersion.

If thermoplastic polymeric resins such as polyethylenes and derivatives thereof, polyvinyl halides, and the like, are desired for use as the stiffening agent of the present invention, they can be readily applied to the shirred food casings either in the form of hot melts by first liquefying them at their respective melt temperatures or as powders which are subsequently liquefied and then cooled.

When utilized, the microcrystalline waxes can also be applied in a manner similar to that described hereinabove for the application of thermoplastic polymeric resins.

It should be further understood that for each particular type of material selected for use as the stiffening agent, optimum conditions for their application to a shirred food casing can be readily determined by those skilled in the art through the practice of this invention. For example, when liquefiable, hot melt materials are selected for use as the stiffening agents they should preferably have a low viscosity in the melt state, be stable at their melt temperature, exhibit good adhesion to the materials employed in fabricating the casing, be capable of rapid set or curing so that the thusly treated casing sticks will not be tacky or adhere to each other, be unaffected by humidification (that is, moisture), and be acceptable for use in connection with food products.

In a preferred embodiment of the present invention, microcrystalline waxes are used as the stiffening agent since they have been found to exhibit all of the desired properties set forth hereinabove. The microcrystalline waxes which can be employed are those which are generally commercially obtainable and which have a low viscosity in the melt state of from between about 80 to 100 centipoises and a melting point of from between about 135° F. to 200° F. A preferred microcrystalline wax is one having a melting point of between about 190° F. to 195° F.

In an alternative embodiment of the present invention, the stiffening agent comprises a mixture consisting of a microcrystalline wax and an ethylene vinyl acetate polymer or copolymer resin. The characteristics and properties of the polymeric ethylene vinyl acetate resins employed are not critical provided they exhibit the basic properties set forth hereinabove and have a melting point of at least about 135° F. when the resin is to be applied in the melt state.

When the stiffening agent employed is a mixture comprising a microcrystalline wax and ethylene vinyl acetate resin, it has been found that a ratio of between about 30:70 parts by weight ethylene vinyl acetate resin to microcrystalline wax is operable. For optimum results, however, it has been found that a ratio of 50:50 parts by weight microcrystalline wax to ethylene vinyl acetate resin is best and this ratio is, therefore, preferred.

It will become apparent to those skilled in the art that other materials such as stabilizers, wetting agent, and the like can also be utilized with the stiffening agents of the present invention. When these materials are used, the physical properties of the mixture, such as viscosity, melting point and so forth, will also sometimes be altered. Hence, the conditions under which these mixtures are applied could require minor adjustments to obtain optimum results. Any such adjustments, however, can be readily determined by those skilled in the art.

The stiffening agent can be applied to the open end of a shirred casing by any convenient method such as by brushing, spraying, dipping, and the like. In a preferred embodiment of the present invention, the stiffening agent is applied to the open end of the casing stick by contacting it with a rotatably mounted, cup-shaped receptacle which is adapted to receive a metered supply of liquefied stiffening agent. Projecting outwardly from the center of the cup-shaped receptacle is a conical shaped member which acts as a plug and serves to prevent the liquefied stiffening agent from entering the bore of the shirred casing stick. Rotation of the cup-shaped receptacle insures that the liquefied stiffening agent will be uniformly applied to the outer surface of the shirred casing stick at its open end. Rotation of the cup-shaped receptacle can be either about a horizontal or vertical axis although rotation about a vertical axis is preferred since it would tend to minimize leakage of the liquefied stiffening agent during application to a shirred casing stick.

Rotation of the cup-shaped receptacle and metering of a sufficient amount of liquefied stiffening agent thereto can be readily provided by means well known to those skilled in the art.

The extent to which the open end of a shirred casing stick can be treated and coated with the stiffening agent is not critical. However, in order to preclude interference with a linked food product, such as linked frankfurters, sausages and the like, the shirred casing stick should be coated such that the stiffening agent extends no more than between about 6 to 8 inches from the open end of the casing stick as measured in its deshirred state. Generally, a length of at least about one inch from the open end of the deshirred casing stick is considered to be the practical minimum length to achieve the purposes intended. Preferably, the stiffening agent should be applied such that it is capable of locking in place the last two consecutive outer pleats formed at the open end of the shirred casing stick thereby maintaining the integrity of these pleats in the shirred casing stick without obstructing the bore of the shirred casing stick at the open end thereof.

The time required to permit the applied stiffening agent to set is also not critical. However, it is preferred that the stiffening agent selected for use be capable of rapid setting in order to meet the demands of production. In this regard, a stiffening agent which sets to a tack-free state within about 5 to 10 seconds after application is preferred. After being applied to the open end of the casing stick, the stiffening agent should be completely cured prior to humidification and preferably prior to packaging the casing sticks in a caddy. In order to enhance or accelerate the setting time, the treated end of the casing stick can be subjected to a stream of cold air prior to humidification or packing of the treated casing stick. However, when other materials are employed as the stiffening agent, it may be more beneficial to direct a stream of warm air on the treated casing to accelerate the setting time.

The present invention will become more clear when considered with the following examples which are set forth by way of illustration and are not intended to be limitative thereof.

EXAMPLE 1

Cellulosic food casings 84 feet in length and having a flat width of 1.36 inches were shirred into 16 inch length casing sticks with commercial shirring apparatus of the type described in the aforementioned U.S. patent to Matecki. The open end of each casing stick was treated with a stiffening agent consisting of a commercially obtained microcrystalline wax having a melting point between 190° F. to 195° F. The microcrystalline wax was liquefied to its molten state by subjecting it to heat and it was then metered in its molten state to a rotating, cup-shaped receptacle provided with a protruding, conical shaped plug member. The open ends of the shirred casing sticks were placed over the conical shaped plug member, brought into contact with the liquefied microcrystalline wax being metered to the cup-shaped receptacle and maintained in this position. In this manner, the open end of each stick was coated on its outer surface with the microcrystalline wax stiffening agent a distance of between about one inch to one and one-half inches as measured on the casing when deshirred. Upon removal from the plug member, the treated casing sticks were permitted to stand for a period of about 10 seconds until the stiffening agent set and was tack-free. The casing sticks were then packed into caddies, each caddy containing 50 shirred casing sticks. The thusly packed casing sticks were then humidified in the usual manner by circulating moist, warm air through apertures in the caddies and the casing sticks permitted to equilibrate for a period of from between 30 minutes to 4 hours. At the end of this time, the caddies were opened, the shirred casing sticks removed and the treated, open end of each casing stick examined. Visual inspection of the treated casing sticks revealed that each casing stick treated with the stiffening agent contained no obstruction in the bore of the casing stick at its open end and that the coated open end did not become disassociated or decompacted.

EXAMPLE 2

Shirred casing sticks having a shirred length of about 17 inches were obtained from two sets of cellulosic food casings having different flat widths but each having a length of about 88 feet. One set of food casings had a flat width of 1.32 inches while the other had a flat width of 1.23 inches. The open end of the shirred food casings were treated with a stiffening agent in the same manner as described in Example 1 above. The same stiffening agent as used in Example 1 above was also employed to treat the open end of the food casing having the larger flat width. The food casing having the smaller flat width, after shirring, was similarly treated with a stiffening agent consisting of a 50:50 parts by weight mixture of the microcrystalline wax of Example 1 and an ethylene vinyl acetate copolymer resin consisting of about 72% ethylene and 28% vinyl acetate and having a softening point of between about 180° F. to 190° F. The microcrystalline wax and ethylene vinyl acetate copolymer were dry mixed prior to liquefying the mixture to its molten state and metering it into the container containing the conical shaped plug member. The treated, shirred casing sticks were packed into caddies prior to humidification in the same manner as described in Example 1 above. After humidification, the casing sticks were left in the caddies for a period of one week—the minimum, permissible time for humidified casings to remain packed prior to use in accordance with the practices generally followed and established by food packers and processors in the industry. At the end of this period, the caddies were opened and the treated casing sticks removed and examined. Visual inspection of each of the thusly treated casing sticks revealed that they were completely free of any obstructions formed in the bore at the open end and the coated open ends were not disassociated or decompacted. These results compared favorably with untreated, shirred casing sticks which were used as a control and which were shirred, humidified and packaged into caddies in the same manner and were also permitted to remain in the caddies for one week. At the end of this period, examination of the open end of these untreated, shirred casing sticks revealed that they contained a maximum of between 2 to 4% per caddy of obstructed bores or disassociated casing at the open ends.

While the present invention has been described in some detail and with particularity, it should be understood that the same is susceptible to changes, modifications and alterations without departing from the spirit and scope of the invention.

What is claimed is:

1. A method for locking the pleats at one end of shirred food casing sticks having an internal bore open at said end thereof so that the pleats formed at said end will not become disassociated and decompacted during humidification of said shirred casing sticks, which method includes the steps of:
   (a) applying a stiffening agent to the outer surface of a shirred casing stick adjacent to the open bore at said end of said casing stick while simultaneously plugging said open bore so as to coat only said outer surface of said casing stick, said stiffening agent being selected from the group consisting of synthetic and natural glues, polymeric resins, thermosetting polymeric resins, thermoplastic polymeric resins, and microcrystalline waxes; and
   (b) permitting the thusly applied stiffening agent to set to at least a tack-free state prior to humidification of said shirred casing stick such that the pleats at said end are locked in place and retain their integrity.

2. The method of claim 1 wherein the stiffening agent is a microcrystalline wax having a melting point of from between about 135° F. to 200° F. and a viscosity in the melt state of from between about 80 to 100 centipoises.

3. The method of claim 1 wherein the stiffening agent is a mixture consisting essentially of a microcrystalline wax and an ethylene vinyl acetate copolymer resin containing about 72% ethylene and 28% vinyl acetate and having a softening point of between about 180° F. to 190° F.

4. The method of claim 3 wherein the ratio of microcrystalline wax to ethylene vinyl acetate copolymer resin is from between about 70:30 to 50:50 parts by weight, respectively.

5. A shirred food casing stick having an internal bore open at one end thereof and having on its outer surface only adjacent said end of said shirred casing stick a coating of a stiffening agent such that the pleats at said end of said casing stick are locked in place and retain their integrity, said stiffening agent being selected from the group consisting of synthetic and natural glues, polymeric resins, thermosetting polymeric resins, thermoplastic polymeric resins, microcrystalline waxes, and a mixture consisting essentially of a microcrystalline wax and a polymeric ethylene vinyl acetate resin.

6. The shirred food casing stick of claim 5 in which said coating extends from the said end of said casing stick a distance of about two pleats.

7. The shirred food casing stick of claim 5 wherein said coating is a microcrystalline wax having a melting point of from between about 135° F. to 200° F. and a viscosity in the melt state of from between about 80 to 100 centipoises.

8. The shirred food casing stick of claim 5 wherein said coating is a mixture consisting essentially of a microcrystalline wax and an ethylene vinyl acetate copolymer resin containing about 72% ethylene and 28% vinyl acetate and having a softening point of between about 180° F. to 190° F.

9. The shirred food casing stick of claim 8 wherein the ratio of microcrystalline wax to ethylene vinyl acetate copolymer resin is from between about 70:30 to 50:50 parts by weight, respectively.

References Cited

UNITED STATES PATENTS

| | | | |
|---|---|---|---|
| 212,309 | 2/1879 | Halvorson | 117—44 |
| 1,073,496 | 9/1913 | Kempshall | 117—44 |
| 2,319,307 | 5/1943 | Eddy | 117—44 |
| 2,619,089 | 11/1952 | Swartz | 117—44 |
| 3,148,992 | 9/1964 | Hewitt | 99—176 |
| 3,342,322 | 9/1967 | Weisner et al. | 99—176 X |
| 3,397,069 | 8/1968 | Urbutis et al. | 99—176 |

LIONEL M. SHAPIRO, Primary Examiner

W. C. LAWTON, Assistant Examiner

U.S. Cl. X.R.

99—175